United States Patent [19]

Pontefract

[11] Patent Number: 5,305,639
[45] Date of Patent: Apr. 26, 1994

[54] LPG GAUGE SENSOR

[75] Inventor: Robert A. Pontefract, Chelmsford, Mass.

[73] Assignee: Scully Signal Company, Wilmington, Mass.

[21] Appl. No.: 962,393

[22] Filed: Oct. 16, 1992

[51] Int. Cl.⁵ .............................................. G01F 23/38
[52] U.S. Cl. .................................... 73/317; 200/84 C; 340/625
[58] Field of Search .......................... 73/317, DIG. 5; 340/625; 324/207.20; 200/84 C

[56] References Cited

U.S. PATENT DOCUMENTS

| | | | |
|---|---|---|---|
| 3,293,579 | 12/1966 | Harper | 200/84 C X |
| 3,339,413 | 9/1967 | Taylor et al. | 73/317 |
| 3,605,498 | 9/1971 | Lamb | 73/431 X |
| 4,688,028 | 8/1987 | Conn | 340/625 |
| 4,748,299 | 5/1988 | Custer | 200/84 C |
| 4,845,486 | 7/1989 | Knight | 340/618 |
| 5,023,806 | 6/1991 | Patel | 73/317 X |

FOREIGN PATENT DOCUMENTS

| | | | |
|---|---|---|---|
| 688402 | 3/1953 | United Kingdom | 200/84 C |
| 568090 | 12/1958 | United Kingdom | 200/84 C |

Primary Examiner—Daniel M. Yasich
Attorney, Agent, or Firm—Cesari and McKenna

[57] ABSTRACT

A liquid petroleum gas (LPG) gauge sensor unit fits between the units of an existing magnetically-coupled LPG gauge and includes a magnetic field sensing switch, a mechanism to variably position the switch and an intermediate magnet. The intermediate magnet is positioned upon an axle-like mechanism upon which it is free to rotate and magnetically couples to the existing gauge base magnet which is, in turn, connected to a float that measures the liquid level. The existing indicator magnet in the gauge assembly magnetically couples with the intermediate magnet so that the gauge unit visually indicates the level of LPG within the LPG tank, despite the increased distance between the base and indicator magnets caused by the sensor unit. The magnetic field sensing switch is used to sense the position of the base or intermediate magnet and thereby sense the liquid level.

16 Claims, 5 Drawing Sheets

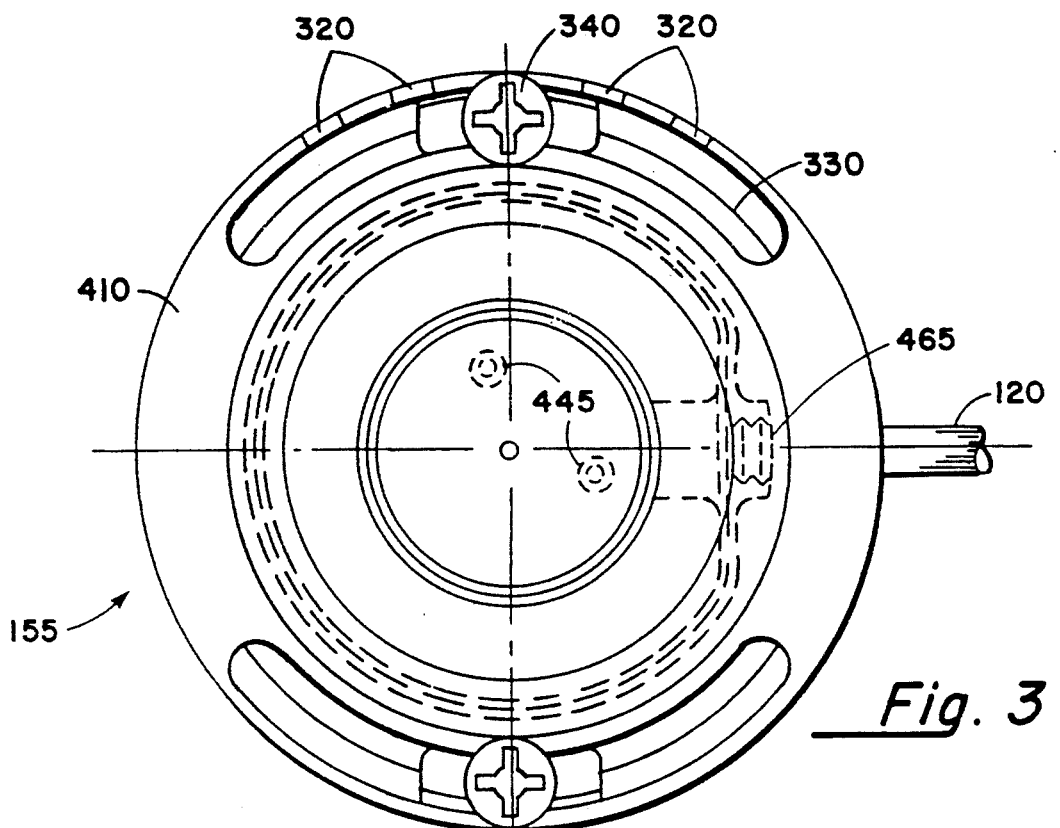
Fig. 3
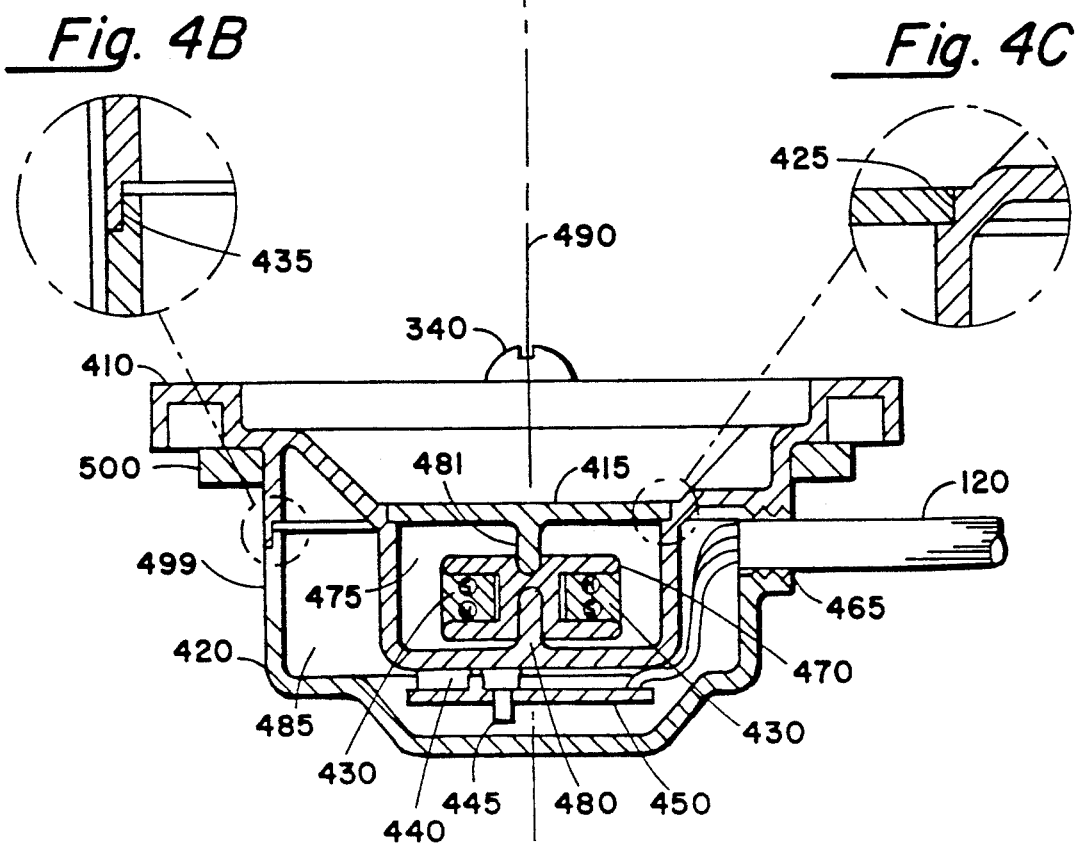
Fig. 4B
Fig. 4C
Fig. 4A

LPG GAUGE SENSOR

FIELD OF THE INVENTION

This invention relates to fuel reordering systems used with liquid petroleum gas (LPG) systems and works in conjunction with existing LPG gauges.

BACKGROUND OF THE INVENTION

LPG is stored in tanks located outside the buildings using this form of fuel. To ensure that an adequate supply of LPG is available to the building, each tank must be periodically refilled by a fuel delivery to the tank location. Fuel requests are placed with a central distributor who makes the deliveries utilizing tank trucks.

Automatic fuel reordering systems alleviate the consumer's inconvenience of periodically checking the fuel level. In addition, by utilizing these systems, distributors operate more efficiently and competitively. Such fuel reordering systems detect when the fuel reaches a particular level and, upon detection, transmit an informational message, via the building's telephone lines, to the distributor. By knowing when and in what quantity a consumer requires fuel, the distributor may more economically schedule fuel deliveries to his or her clients. In general, deliveries will be made only when a consumer requires a substantially full tank-load. An example of a fuel reordering system is disclosed in U.S. Pat. No. 4,845,486.

To date, fuel reordering systems have been substantially limited to fuel oil systems. In one prior art example, the fuel level is directly sensed by a capacitive sensor. This type of sensor employs concentric cylinders that are inserted into the fuel tank. The fuel oil forms a portion of the dielectric between the concentric cylinders, and air within the tank forms the remainder. As the level of fuel oil decreases, the fuel oil comprises a lesser portion of the dielectric, thereby changing the resulting capacitance of the cylindrical capacitor. An electronic circuit compares the resulting capacitance with a reference capacitance corresponding to the particular level of fuel to be detected. (The particular fuel level to be detected is hereinafter referred to as a "watchpoint.") When the capacitances are relatively equal, the circuit conveys an informational message to the fuel reordering system, so that a fuel request can be made to the distributor. In fuel oil systems, directly sensing the fuel oil level by capacitive sensing, or other equally active and invasive methods, represents relatively little danger as fuel oil is non-explosive.

The prior art has employed indirect sensing of the fuel oil level under limited conditions. For example, in fuel oil systems utilizing a mechanical, sliding float gauge, the position of the mechanically sliding indicator element is sensed, rather than sensing the fuel level itself. A magnet is affixed to the indicator element, and a magnetic reed switch is attached to the fuel gauge in a position corresponding to the desired watchpoint. The reed switch detects when the magnet comes within a certain proximity, and upon detection, conveys an indicative signal to the fuel reordering system. This sensing method is limited to only certain types of mechanical fuel oil gauges and is substantially limited to fuel oil systems. Only certain gauge types allow the reed switch to be attached and also allow access to the gauge's indicator element so that the magnet can be affixed. This method of sensing, with its concomitant gauge modifications, is acceptable for fuel oil systems, as there is a negligible risk of explosion in such systems. See U.S. Pat. No. 4,845,486 for more discussion on prior art reordering systems and their sensing methods.

LPG systems have more demanding requirements than fuel oil systems. LPG tanks and LPG gauges, which are attached to the tanks, are located outside buildings. Consequently, LPG gauges must withstand extreme environmental conditions. In addition, because LPG is stored under pressure and is highly explosive, a LPG system must ensure that the gas does not leak or inadvertently flow into the building. A stuck valve or gauge can result in catastrophe. The LPG sensor must be able to meet these same stringent demands and not add any risk of leakage or explosion.

Capacitive sensing is unacceptably risky for LPG installations. First, the LPG could experience a capacitive discharge and explode. Second, because the sensors require openings in the LPG tank for the capacitor apparatus, leaks might result and cause an explosion.

Due to the constraints involved, currently known sensors are unacceptable. Most of the currently known sensors do not adequately address the safety concerns of a highly explosive fuel and extreme environmental conditions. Some require access to the gauge's internals, thereby increasing the cost and difficulty of installation. Others require the existing LPG gauge to be replaced, thereby significantly increasing the cost. For example, a sensor device for use with LPG systems is manufactured by Squibb-Taylor, 10807 Harry Hines Blvd., Dallas, Tex. 75220, under the name of the ATLAS Monitoring/Reporting System. The ATLAS system requires replacing the entire LPG gauge indicator element with the sensing apparatus. The sensing apparatus is therefore more complicated since it must include indicator element functionality. Further, the gauge's original indicator element is wasted. Lastly, most known sensors are incompatible with the predominant LPG gauge in the market, the Rochester 6200, manufactured by Rochester Gauges Inc. of Texas, located at P.O. BOX 29242, 11616 Harry Hines Blvd., Dallas, Tex. 75229.

The Rochester gauge shown in FIG. 6 is comprised of two self-contained, hermetic units: the base unit 157 and the indicator unit 150. The base unit 157 is attached to the LPG tank and includes a float mechanism 158 to be inserted into the tank. The float mechanism 158 is responsive to the level of liquified fuel within the tank. Attached to the float mechanism is a rod 600 and gear mechanism 602 that rotates responsively to the position of the float mechanism. A base magnet 604 is transversely attached to the distal end of the rod 600. Thus, the angular orientation of the base magnet 604 corresponds to the amount of fuel within the tank.

The indicator unit 150 visually indicates the fuel level. This unit is aligned with and secured to the base unit by screws 340. The indicator unit 150 includes an indicator magnet 606 that is connected to an indicator element 152. Much like a compass, the indicator magnet 606 couples with the base magnet 604. The indicator element 152, being attached to the indicator magnet 606, is thereby responsive to the fuel level.

As previously mentioned, the LPG system is potentially subject to extreme environmental conditions. The magnetic coupling between the base and indicator magnets (604, 606) allows each unit to be sealed. Sealing each unit minimizes the risk of water or moisture freezing within a unit and thereby freezing it. Separate hermetic units also minimize the likelihood of LPG leaks.

For example, in the Rochester gauge, only the base unit 157 presents any risk of fuel leakage. (Hereinafter the Rochester gauge is referred to as the "LPG gauge.")

Accordingly, it is an object of the present invention to provide a sensing unit capable of detecting when a LPG gauge indicates that a particular fuel level has been reached.

It is another object of the present invention to be compatible with existing LPG gauges and fuel reordering systems.

It is another object of the present invention to provide a LPG level sensing unit that is easy to install and safe.

It is a further object of the present invention to achieve a low component count by utilizing the functionality of the LPG gauge.

SUMMARY OF THE INVENTION

The foregoing objects are achieved and the foregoing problems are solved in one illustrative embodiment of a LPG gauge sensor which fits between the units of an existing LPG gauge. The LPG gauge sensor includes a switch, a mechanism to variably position the switch, one or more intermediate magnets, and circuitry, known in the art, to ensure that proper power levels are supplied to the sensor.

The intermediate magnet is positioned upon an axle-like mechanism upon which it is free to rotate. The axle-like mechanism is aligned with the longitudinal axis of the LPG gauge. The base magnet retains a position corresponding to the float position and remains substantially unaffected by the intermediate magnet's magnetic force. The intermediate magnet is responsive to the LPG gauge's base magnet and attains an angular orientation reflecting that of the base magnet. In turn, the indicator magnet magnetically couples with the intermediate magnet and likewise attains the angular orientation of the base magnet. Consequently, the indicator unit visually indicates the level of LPG within the LPG tank, despite the increased distance between the base and indicator magnets.

In one embodiment, the switch detects the position of the intermediate magnets and synthesizes an indicative signal when the intermediate magnets reach a certain proximity to the switch. A Hall switch or equivalent thereof is a suitable switch. The indicative signal is utilized by a fuel reordering system to place a fuel request with the distributor.

The mechanism to variably position the switch is comprises of two housings. The two housings partially fit together, and both are placed between the LPG gauge's units along the longitudinal axis of the LPG gauge's units. The first housing is connected to the base unit, and the second housing remains essentially unconnected. The second housing contains the switch in an off-axis position. The second housing is shaped such that, if the securing screws are sufficiently loosened, the housing can be manually rotated about the longitudinal axis, thereby variably positioning the switch.

Since the switch can be variably positioned, the switch can detect selectable positions of the intermediate magnets. Because each base magnet position corresponds to a different level of fuel, the LPG gauge sensor can detect selectable watchpoints.

In another embodiment of the invention, the intermediate magnet is avoided by utilizing a magnetic sensor with sufficient sensitivity to detect the orientation of the base magnet. A reed switch would be suitable.

The LPG gauge sensor contains circuitry to ensure proper power levels are supplied to the LPG gauge sensor.

BRIEF DESCRIPTION OF THE DRAWING

The invention will become more apparent from the following detailed specification and drawing in which:

FIG. 3 is a top view of the LPG gauge sensor;

FIG. 4 are a cross-sectional view of the magnet housing and switch housing, including a view of the intermediate magnets and their holder, the Hall Effect switch and corresponding circuit board and bus.

DETAILED DESCRIPTION OF THE PREFERRED EMBODIMENT

Figure 1:
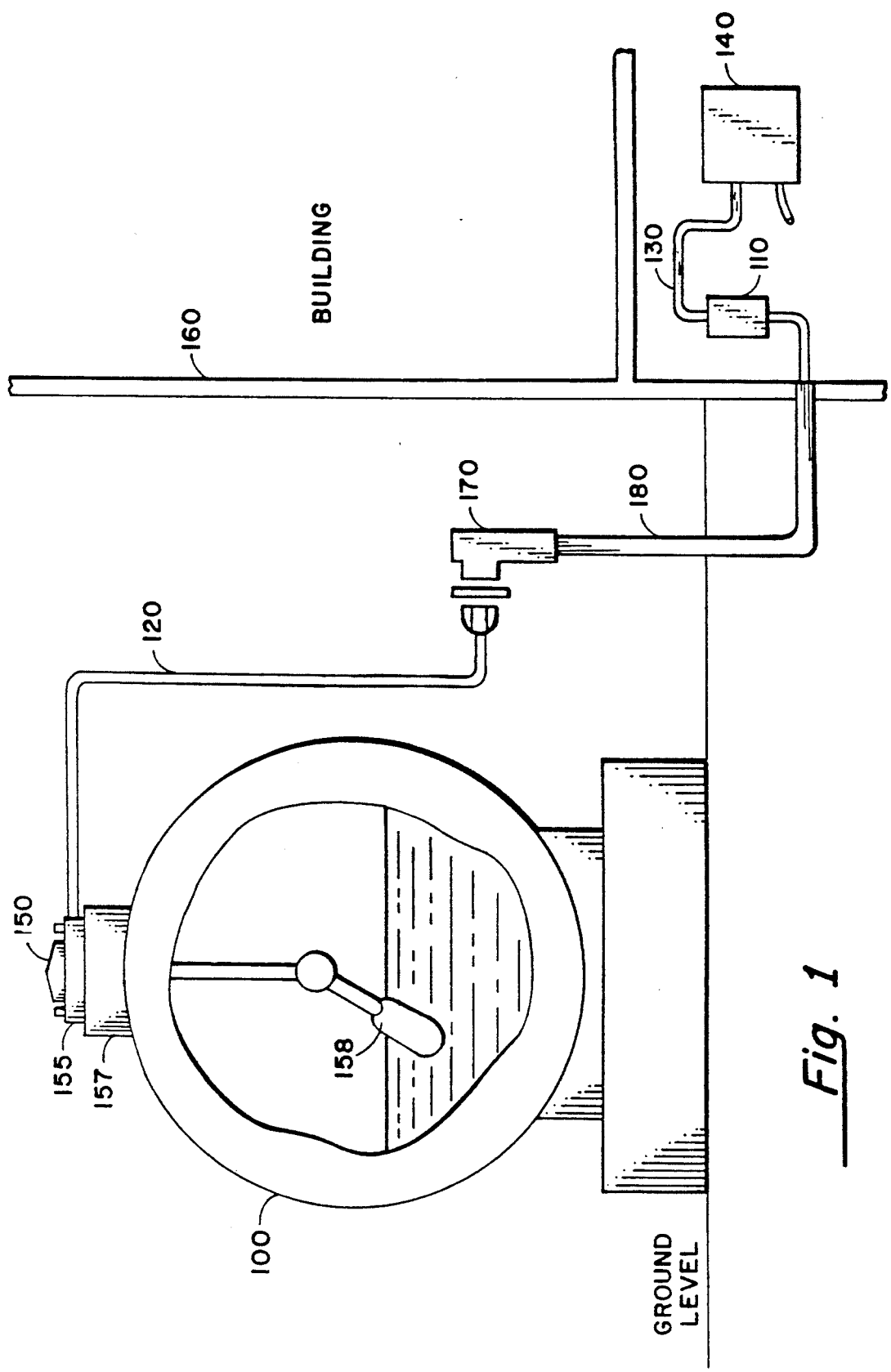
FIG. 1 is schematic diagram of the present invention as used with a fuel reordering system.
Figure 6:
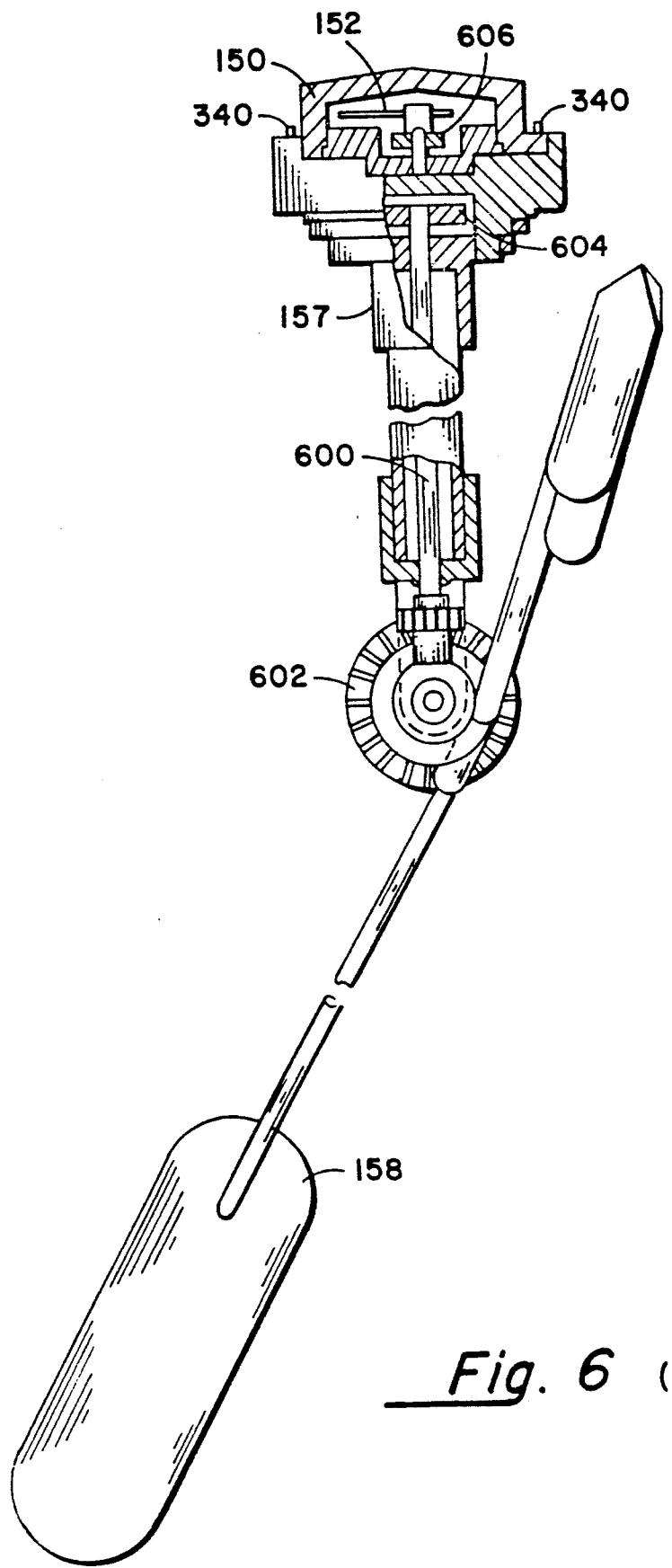
FIG. 6 is a partial schematic of a prior art LPG gauge showing the magnetic coupling between the base unit and the indicator unit.

FIG. 1 is a schematic diagram of the present invention as used with a fuel reordering system. LPG tank 100 is located outside building 160 which utilizes the LPG fuel stored within tank 100. Fuel lines to building 160 are not shown. LPG gauge base unit 157 is connected to tank 100. LPG gauge base unit 157 contains a base magnet, (604, in FIG. 6), that is responsive to LPG gauge float 158, located within tank 100. Indicator unit 150 visually indicates the level of LPG by a gauge-like mechanism 152. Located between base unit 157 and indicator unit 150 is the LPG gauge sensor 155. As will be described below, LPG gauge sensor 155 detects when the base magnet 604 within base unit 157 attains a particular angular orientation corresponding to a particular level of fuel. Upon detecting such an orientation, LPG gauge sensor 155 transmits an indicative signal to Intrinsically Safe Barrier Unit 110 (hereinafter ISB 110) via cables 120 and 180 and waterproof junction box 170. ISB 110 limits the power supplied to LPG gauge sensor 155. The indicative signal is sent to fuel reordering system 140, via cable 130. The fuel reordering system 140 can then transmit a message to the distributor, requesting a fuel delivery.

LPG gauge sensor 155 does not directly sense the fuel's level. Instead, by utilizing well known features of LPG gauges, LPG gauge sensor 155 detects when the LPG gauge is indicating a particular fuel level. As is more fully described below, this affords a safe, economical, and easy to install fuel level sensing unit.

Figure 2:
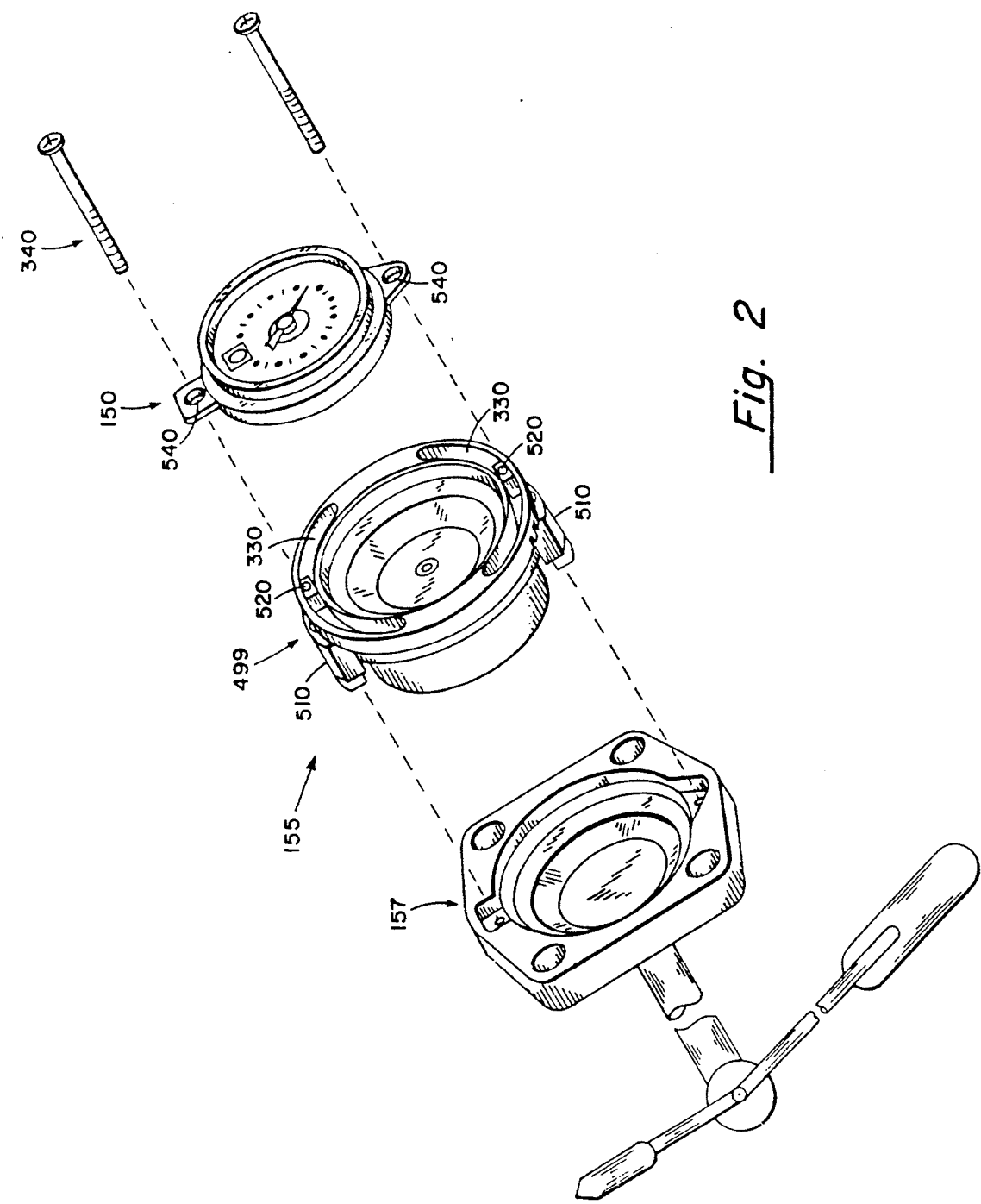
FIG. 2 is a schematic diagram of the LPG gauge sensor as used with a typical, magnetically-coupled liquid gas gauge.

FIG. 2 is a schematic diagram of LPG gauge sensor 155 as used with the hermetic units of a LPG gauge. These units, the base unit 157 and the indicator unit 150, were described previously to aid the description of the present invention. In operative position, LPG gauge sensor 155 is placed between indicator unit 150 and base unit 157. As readily seen from the diagram, this requires longer securing screws 340 than would be needed in the absence of LPG gauge sensor 155.

Referring to FIG. 3, a top view and FIG. 4, a cross-sectional view, slots 330, within magnet housing 410, allow the joined housing 499, comprised of switch housing 420 and magnet housing 410, to be rotated about axis 490. As will be further described below in discussing FIG. 5, components within joined housing 499 are thereby repositioned relative to the alignment ring 500 by such rotation. Grooves 320, on the underside of magnet housing 410, correspond to the selectable fuel levels, a.k.a. watchpoint levels. These grooves are engaged by a raised rib 530 located adjacent to one of alignment towers 510 510 of alignment ring 500, see FIG. 5 and described later.

Figure 5:
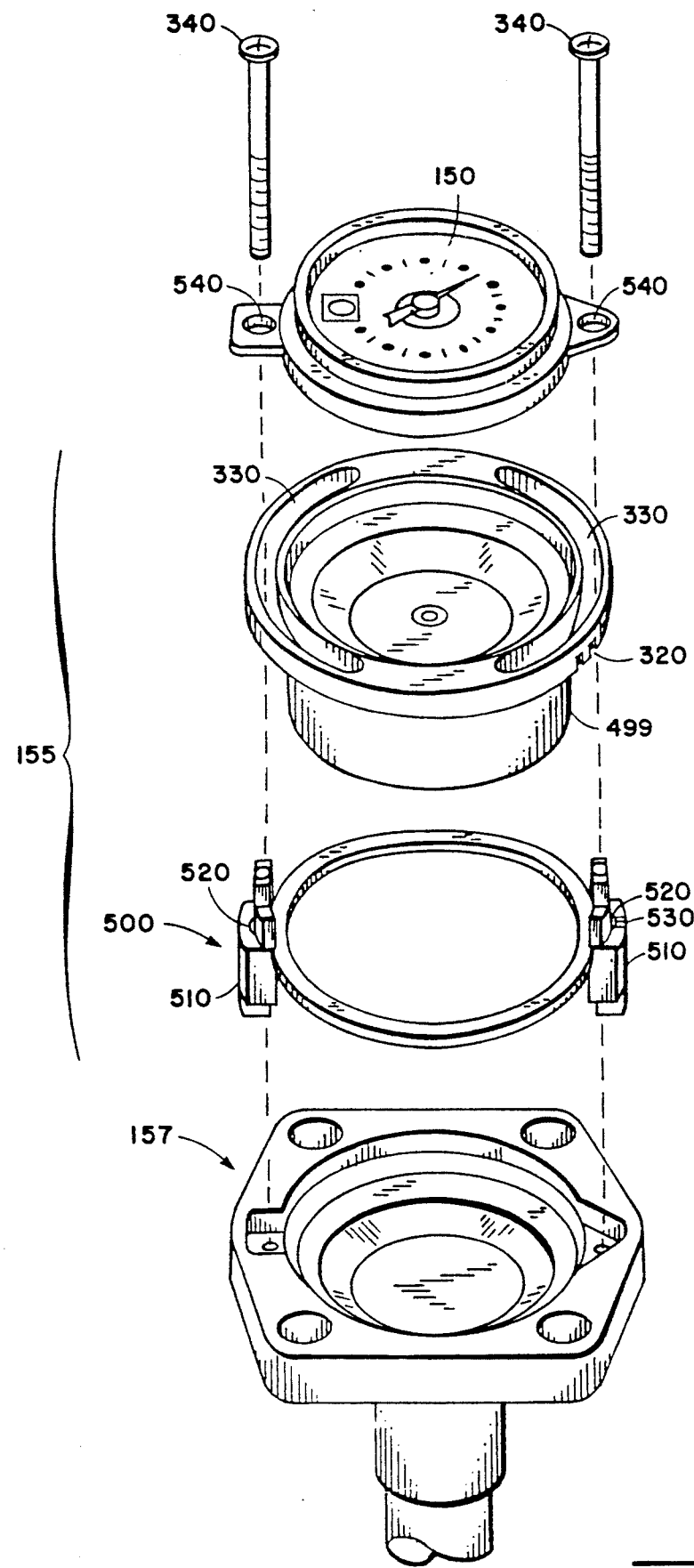
FIG. 5 is an exploded view of the sensor arranged between the two units of a conventional Rochester gauge, particularly illustrating the alignment ring.

Referring to FIG. 4 and FIG. 5, LPG gauge sensor 155 is comprised of three items: a switch housing 420, a magnet housing 410, and an alignment ring 500. FIG. 4 is a cross-sectional view of switch and magnet housings 420 and 410 and includes a view of intermediate magnets 430, Hall Effect switch 440, circuit board 450, and cable 120.

Referring to FIG. 4, magnet housing 410 includes axle 480, upon which magnet holder 470 is placed. Magnet holder 470 contains intermediate magnets 430 and is free to rotate about the axle-like mechanism comprised of axle 480 and top axle 481. Compartment 475 is formed into a hermetic, dry atmosphere compartment by purging compartment 475 with dry nitrogen gas or the like and immediately placing magnet compartment lid 415 on joints 425. Magnet compartment lid 415 is affixed to magnet housing 410 by adhesive or ultrasonic welding or similar means. Magnet compartment lid 415 includes top axle 481 further forming the axle-like mechanism which magnet holder 470 is free to rotate about.

Switch housing 420 is affixed to magnet housing 410 at joints 435 by adhesive or ultrasonic welding or similar means. Tongue and groove joint is shown in an exploded view accompanying FIG. 4. Hall Effect switch 440 is connected to circuit board 450 in an off-axis position. Locating pins 445 position circuit board 450 relative to the joined housings and ensure that circuit board 450 and Hall Effect switch 440 securely remain in place. See FIG. 3. for a top view of locating pins 445. Locating pins 445 pass through locating holes, not shown, in circuit board 450. After switch housing 420 and magnet housing 410 are joined into joined housing 499, and after circuit board 450 with switch 440 is positioned, compartment 485 is injected with potting compound, not shown, through either of two holes, not shown, along joint 435. The compound enters through one hole, while the other hole ensures proper ventilation during the potting process. Cable 120 is connected to circuit board 450 by ordinary contact means and passes out of the joined housings via strain relief 465.

Referring to FIG. 5, alignment ring 500 aligns the LPG gauge indicator and base units, 150 and 157, relative to joined housing 499. Joined housing 499 is placed over alignment ring towers 510, which project through semi-circular slots 330. Securing screws 340 pass through holes 540 in indicator unit 150, through slots 330 in joined housing 499, through holes 520 in alignment ring 500, and into base unit 157.

To select a particular watchpoint, securing screws 340 are loosened to raise joined housing 499 a distance above raised rib 530. Joined housing 499 is then rotated until raised rib 530 aligns with one of grooves 320 corresponding to the desired watchpoint. As previously stated, rotating joined housing 499 angularly repositions switch 440 about axis 490. When one of grooves 320 is aligned with raised rib 530, the Hall Effect switch 440 will be angularly positioned so that it will be operated by one of the intermediate magnets 430 (whose angular position depends on the angular position of the base magnet 604 which, in turn, depends on the fuel level) when the fuel level reaches the desired watchpoint. Each one of grooves 320 corresponds to a particular LPG tank level. For example, one groove might correspond to a 19% full LPG level, while another might correspond to a 40% full level. Securing screws are tightened to ensure the rib and groove remain engaged.

Referring to FIG. 4, switch 440 is contained in hermetic, potted compartment 485 to ensure that moisture cannot enter the compartment and thereby affect the switch's operation. This ensures that the switch will function even under adverse environmental conditions.

As previously described, the base magnet 604 of the LPG gauge responsively positions according to LPG level changes. Magnet holder 470, containing intermediate magnets 430, is free to rotate about axles 480 and 481. Magnets 430 couple with the base magnet 604 and will angularly align to the base magnet's orientation. The base magnet 604 retains its position corresponding to the LPG level and is relatively unaffected by the intermediate magnets magnetic field. The indicator magnet 606 (FIG. 6) magnetically couples with intermediate magnets 430 and likewise aligns itself to the base magnet 604, thereby ensuring proper indicator element functionality.

Intermediate magnets 430 generate a magnetic field strong enough to operate Hall switch 440. Further, the intermediate magnets 430 allow the distance between the base magnet 604 and the indicator unit 150 to be increased to insert Hall effect switch 440, thus easily allowing the use of readily available types of Hall effect switches. Lastly, the intermediate magnets 430, by providing a magnetic field strength many times stronger than that of the base magnet, removes the effect of the wide variations in the base magnet field strength present in different types of gauges and preserves the orientation of the indicator element (within indicator unit 150) relative to the base magnet.

Intermediate magnets 430 are placed within hermetic, dry atmosphere compartment 475 to ensure that intermediate magnets 430 will couple with the base magnet 604, even under adverse environmental conditions. Hermetic, dry atmosphere compartment 475 ensures that no moisture will enter the compartment, possibly freeze and thereby prevent the intermediate magnet holder 470 from rotating about the axle 480.

In the just described embodiment of the invention, intermediate magnets 430 ensures that the indicator element 152 within indicator unit 150 retains proper functionality. Further, switch 440 detects the proximity of intermediate magnet 430. Thus, though switch 440 detects the proximity of intermediate one of magnets 430, switch 440 is ultimately responsive to the base magnet's orientation because the base magnet orientation is controlled by the fuel level.

In an alternative embodiment of the invention, a switch of sufficient magnetic sensitivity is utilized to detect the orientation of the base magnet 604 directly. This embodiment can eliminate the intermediate magnets 430, associated holders 470, axles 480, magnet compartment 475, and the associated manufacturing steps. A conventional reed switch would be of sufficient sensitivity to be used in this embodiment.

ISB 110, see FIG. 2, utilizes well known techniques to limit the power supplied to sensor 155.

Having thus described several particular embodiments of the invention, various alterations, modifica- tions, and improvements will readily occur to those skilled in the art. Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended to be limiting. The invention is limited only as defined in the following claims and equivalents thereto.

What is claimed is:

1. Sensor apparatus to be employed with a LPG gauge which measures an LPG level in a tank, said LPG gauge having a hermetic base unit connected to said tank, a base magnet located in said base unit, means for rotating said base magnet to an angular position corresponding to said LPG level, a hermetic indicator unit containing an indicator magnet which magnetically couples to said base magnet, a longitudinal axis along said base unit and said indicator unit, and an indicator element connected to said indicator magnet, said sensor apparatus comprising:
   a hermetic housing having a shape which allows said housing to be mounted between said base unit and said indicator unit;
   means located in said housing and responsive to the angular position of said base magnet for generating an indicative signal when said base magnet reaches a predetermined proximity to said generating means; and
   means for variably positioning said generating means relative to said base magnet to generate said indicative signal when said base magnet reaches a predetermined angular position.

2. Sensor apparatus as described in claim 1 further comprising at least one intermediate magnet and means to position said at least one intermediate magnet transversely to said longitudinal axis, said at least one intermediate magnet having sufficient magnetic strength to couple with said indicator magnet and said base magnet.

3. Sensor apparatus as described in claim 1 wherein said means for generating comprises a magnetically responsive switch that generates an indicative signal upon detecting a magnetic field of predetermined magnetic strength.

4. Sensor apparatus to be employed with an LPG gauge which measures an LPG level in a tank, said LPG gauge having a hermetic base unit connected to said tank, a base magnet located in said base unit, means for rotating said base magnet to an angular position corresponding to said LPG level, a hermetic indicator unit, an indicator magnet which magnetically couples to said base magnet located within said indicator unit, a longitudinal axis along said base unit and said indicator unit, and an indicator element connected to said indicator magnet, said sensor apparatus comprising:
   magnetically responsive switch means responsive to said base magnet for generating an indicative signal when said base magnet reaches a predetermined proximity to said magnetically responsive switch means,
   a rotatable unit and an alignment unit, each of said rotatable unit and said alignment unit having a shape which allows said units to be mounted between said base unit and said indicator unit, said alignment unit being connected to said base unit, said rotatable unit containing said magnetically responsive switch means, and said rotatable unit including means cooperating with said alignment unit to allow manual rotation of said rotatable unit about the longitudinal axis to bring said magnetically responsive switch means into a position where said magnetically responsive switch means generates said indicative signal when said base magnet reaches a predetermined angular position.

5. Sensor apparatus as described in claim 4 further comprising at least one intermediate magnet, a magnet holder containing said at least one magnet, and an axle means along said longitudinal axis, said magnet holder being transversely positioned upon said axle means, said at least one intermediate magnet having sufficient magnetic strength to couple with said base magnet and said indicator magnet.

6. Sensor apparatus as described in claim 5 wherein said rotatable unit includes a hermetic, dry atmosphere compartment, said hermetic, dry atmosphere compartment containing said at least one intermediate magnet, said magnet holder, and said axle means.

7. Sensor apparatus as described in claim 5 wherein said magnetically responsive switch means for generating is a Hall-Effect switch.

8. Sensor apparatus as described in claim 7 further comprising a circuit board connected to said rotatable unit, said Hall-effect switch being mounted upon said circuit board in a position offset from said longitudinal axis.

9. Sensor apparatus as described in claim 8 wherein said rotatable unit includes a hermetic, potted compartment, said hermetic, potted compartment containing said circuit board.

10. Sensor apparatus as described in claim 7 wherein said Hall-effect switch has sufficient sensitivity to detect a magnetic field produced by said at least one intermediate magnet.

11. Sensor apparatus as descried in claim 4 wherein said alignment unit and rotatable unit are comprised of a polymeric material.

12. Sensor apparatus as described in claim 4 wherein said magnetically responsive switch means for generating is sufficiently sensitive to detect a magnetic field produced by said base magnet.

13. Sensor apparatus to be employed with an LPG gauge which measures an LPG level in a tank, said LPG gauge having a hermetic base unit connected to said tank, a base magnet located in said base unit, means for rotating said base magnet to an angular position corresponding to said LPG level, a hermetic indicator unit, an indicator magnet which magnetically couples to said base magnet located within said indicator unit, a longitudinal axis along said base unit and said indicator unit, and an indicator element connected to said indicator magnet, said sensor apparatus comprising:
   at least one intermediate magnet having sufficient magnetic strength to couple with said indicator magnet and said base magnet;
   a magnet holder containing said at least one intermediate magnet;
   an axis means disposed along said longitudinal axis, said magnet holder being rotatably mounted upon said axle means;
   a Hall-Effect switch responsive to a magnetic field produced by said at least one intermediate magnet;
   a polymeric material alignment ring connected to said first housing and having at least one tower protruding perpendicularly from the plane of said ring, said at least one tower having a protruding rib, a circuit board, said Hall-Effect switch being mounted on said circuit board, a polymeric material rotatable housing means having a hermetic, potted compartment and a hermetic, dry atmosphere compartment, said rotatable housing means having a shape to partially fit through and over said alignment ring thereby abutting said alignment ring, said rotatable housing means having semicircular slots through which said at least one tower protrudes, said semicircular slots allowing said rotatable housing means to be rotated about the longitudinal axis, said rotatable housing means including a series of grooves on a section of said rotatable housing means that abuts said alignment ring, said grooves having shape to be engageable by said rib, said hermetic, potted compartment containing said circuit board, said circuit board being connected to said rotatable housing means such that said Hall-Effect switch is offset from the longitudinal axis, said hermetic, dry atmosphere compartment containing said at least one intermediate magnet, said holder and said axle means.

14. Sensor apparatus as described in claim 13 wherein said rotatable housing means is comprised of a switch housing, a magnet housing, and a magnet housing lid, and wherein said axle means is comprised of a first axle piece and a second axle piece, said magnet housing having an open face perpendicular to said longitudinal axis, said magnet housing lid being positioned upon said open face and joined to said magnet housing, said first axle piece positioned on a wall of said magnet housing opposite said open face, said magnet housing lid including the second axle piece positioned such that when said lid is placed upon said open face said second axle piece engages said magnet holder, said switch housing having an open face and having such shape and dimension that said magnetic housing fits substantially within said switch housing through said open face, said magnet housing thereby abutting said switch housing and forming a hermetic compartment therein, said circuit board being connected to a portion of said magnet housing disposed within said switch housing.

15. Sensor apparatus as described in claim 14 wherein said switch housing includes a plurality of recesses along a side of said housing that abuts said magnet housing, said recesses thereby forming conduits which provide a means for injecting potting compound into the hermetic compartment containing said circuit board and which provide a ventilation means to facilitate the injection of potting compound.

16. Sensor apparatus as described in claim 14 wherein said magnet housing is purged by dry nitrogen gas before said magnet housing lid is placed upon said open face of said magnet housing.

* * * * *